US007437278B2

(12) United States Patent
Suzuki

(10) Patent No.: US 7,437,278 B2
(45) Date of Patent: Oct. 14, 2008

(54) SIMULATION METHOD, SIMULATION APPARATUS, AND COMPUTER PROGRAM PRODUCT FOR SIMULATION

(75) Inventor: Tatsuya Suzuki, Tokyo (JP)

(73) Assignee: Olympus Corporation, Tokyo (JP)

( * ) Notice: Subject to any disclaimer, the term of this patent is extended or adjusted under 35 U.S.C. 154(b) by 239 days.

(21) Appl. No.: 11/356,663

(22) Filed: Feb. 17, 2006

(65) Prior Publication Data

US 2006/0259284 A1 Nov. 16, 2006

Related U.S. Application Data

(63) Continuation of application No. PCT/JP2005/017321, filed on Sep. 14, 2005.

(30) Foreign Application Priority Data

May 10, 2005 (JP) ............................ 2005-137853

(51) Int. Cl.
*G06F 17/50* (2006.01)
*B32B 21/13* (2006.01)
*B07C 5/14* (2006.01)

(52) U.S. Cl. .......................... 703/2; 700/167; 700/171; 250/559.45; 702/35; 428/114

(58) Field of Classification Search ..................... 703/2; 700/167, 171; 250/559.48, 559.45; 702/35; 428/114; 52/311.1
See application file for complete search history.

(56) References Cited

U.S. PATENT DOCUMENTS

| | | | | |
|---|---|---|---|---|
| 4,221,974 | A | 9/1980 | Mueller et al. | 250/559.48 |
| 6,272,437 | B1 * | 8/2001 | Woods et al. | 702/35 |
| 6,624,883 | B1 * | 9/2003 | Zhou et al. | 356/237.1 |
| 6,690,990 | B1 * | 2/2004 | Caron et al. | 700/171 |
| 2002/0100565 | A1 * | 8/2002 | Riebel et al. | 162/97 |
| 2003/0108717 | A1 * | 6/2003 | Sjoberg | 428/151 |
| 2007/0105981 | A1 * | 5/2007 | Kraker | 523/171 |

FOREIGN PATENT DOCUMENTS

| | | |
|---|---|---|
| EP | 0 692 372 A1 | 1/1996 |
| JP | 08-025301 | 1/1996 |
| JP | 11-077619 | 3/1999 |

* cited by examiner

*Primary Examiner*—Thai Phan
(74) *Attorney, Agent, or Firm*—Hogan & Hartson LLP

(57) ABSTRACT

A simulation method according to which a simulation apparatus, including a storage unit, generates a simulant image indicating a cut-out position of a wooden piece in raw wood and a shape of the wooden piece having a predetermined three-dimensional shape at shaping of the wooden piece from the raw wood, includes receiving an input of a grain pattern which is to appear on a surface of a wooden piece cut out from the raw wood; determining whether a wooden piece can be cut out from the raw wood so that the wooden piece has the three-dimensional shape and a surface showing a similar grain pattern to the received grain pattern; generating a simulant image indicating a cut-out position and a shape of the wooden piece in the raw wood, when it is determined that the wooden piece can be cut out; and outputting the generated simulant image.

11 Claims, 13 Drawing Sheets

SIMULATION METHOD, SIMULATION APPARATUS, AND COMPUTER PROGRAM PRODUCT FOR SIMULATION

CROSS-REFERENCE TO RELATED APPLICATIONS

This application is a continuation of PCT international application Ser. No. PCT/JP2005/017321 filed Sep. 14, 2005 which designates the United States, incorporated herein by reference, and which claims the benefit of priority from Japanese Patent Application No. 2005-137853, filed May 10, 2005, incorporated herein by reference.

BACKGROUND OF THE INVENTION

1. Field of the Invention

The present invention relates to a simulation method, a simulation apparatus, and a computer program product for simulation, for generating a simulant image of a wooden piece to be cut out from raw wood with an indication of a position and a shape of the wooden piece in the raw wood, for the purpose of manufacturing a wood product with a desired grain pattern.

2. Description of the Related Art

In recent years, wood which is natural material attracts attention. With a wide variety of grain patterns, wood products made of wood exhibit individual features depending on positions of the raw wood from which the particular wood products are cut out. Such individual features of each wood product give it a unique quality. In addition, surface damages and discoloration caused by a long-term use create unique textures which tend to evoke warm and familiar feeling in the user. Thus, wood attracts attention as a material for products of uniqueness and taste which cannot be found in products made of synthetic resin or light metals. Techniques for processing wooden pieces are also developing dramatically.

According to one conventionally known technique for processing wooden pieces: a wooden board is softened with water absorption and compressed; the compressed wooden board is cut along a direction substantially parallel with a direction in which the compressing force is applied, whereby a primary fixed product with a sheet-like shape is obtained; and the primary fixed product is deformed into a desired three-dimensional shape under heat and moisture (for example, see Japanese Patent No. 3078452 Publication). Further, according to another conventional technique, a softened wooden board is compressed and temporarily secured in a prepared mold and left in the mold until the wooden board recovers. Thus a wood product with a desired shape can be obtained (see, for example, Japanese Patent Laid-Open No. H11-77619 Publication).

SUMMARY OF THE INVENTION

A simulation method, according to which a simulation apparatus which includes a storage unit which stores raw wood information about a shape and a grain pattern of the raw wood and shape information about a shape of a wooden piece to be cut out from the raw wood, generates a simulant image indicating a cut-out position of a wooden piece in raw wood and a shape of the wooden piece having a predetermined three-dimensional shape at shaping of the wooden piece from the raw wood, according to one aspect of the present invention, includes receiving an input of a grain pattern which is to appear on a surface of a wooden piece cut out from the raw wood; determining whether a wooden piece can be cut out from the raw wood so that the wooden piece has the three-dimensional shape and a surface showing a similar grain pattern to the received grain pattern, based on the received grain pattern, and the raw wood information and the shape information read out from the storage unit; generating a simulant image indicating a cut-out position and a shape of the wooden piece in the raw wood, when it is determined that the wooden piece can be cut out; and outputting the generated simulant image.

A simulation apparatus according to another aspect of the present invention generates a simulant image indicating a cut-out position of a wooden piece in raw wood and a shape of the wooden piece having a predetermined three-dimensional shape at shaping of the wooden piece from the raw wood. The simulation apparatus also includes a storage unit that stores raw wood information about a shape and a grain pattern of the raw wood, and shape information about a shape of a wooden piece to be cut out from the raw wood; an input unit that receives an operation instruction signal indicating an operation of the simulation apparatus, and an input of a grain pattern which is to appear on a surface of the wooden piece cut out from the raw wood; a determining unit which determines whether a wooden piece can be cut out from the raw wood so that the wooden piece has the three-dimensional shape and a surface showing a similar grain pattern to the input grain pattern, based at least on the grain pattern received by the input unit, and the raw wood information and the shape information stored in the storage unit; an image generating unit that generates a simulant image indicating a cut-out position and a shape of the wooden piece in the raw wood based on a result of determination by the determining unit; and an output unit that supplies the simulant image generated by the image generating unit as an output.

A computer program product for simulation according to still another aspect of the present invention has a computer readable medium which includes programmed instructions, and when the instructions are executed by a computer, the instructions cause the simulation apparatus to perform the simulation method according to the present invention.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

In the following, exemplary embodiments of the present invention (hereinbelow simply referred to as embodiments) will be described with reference to the accompanying drawings.

Figure 1:
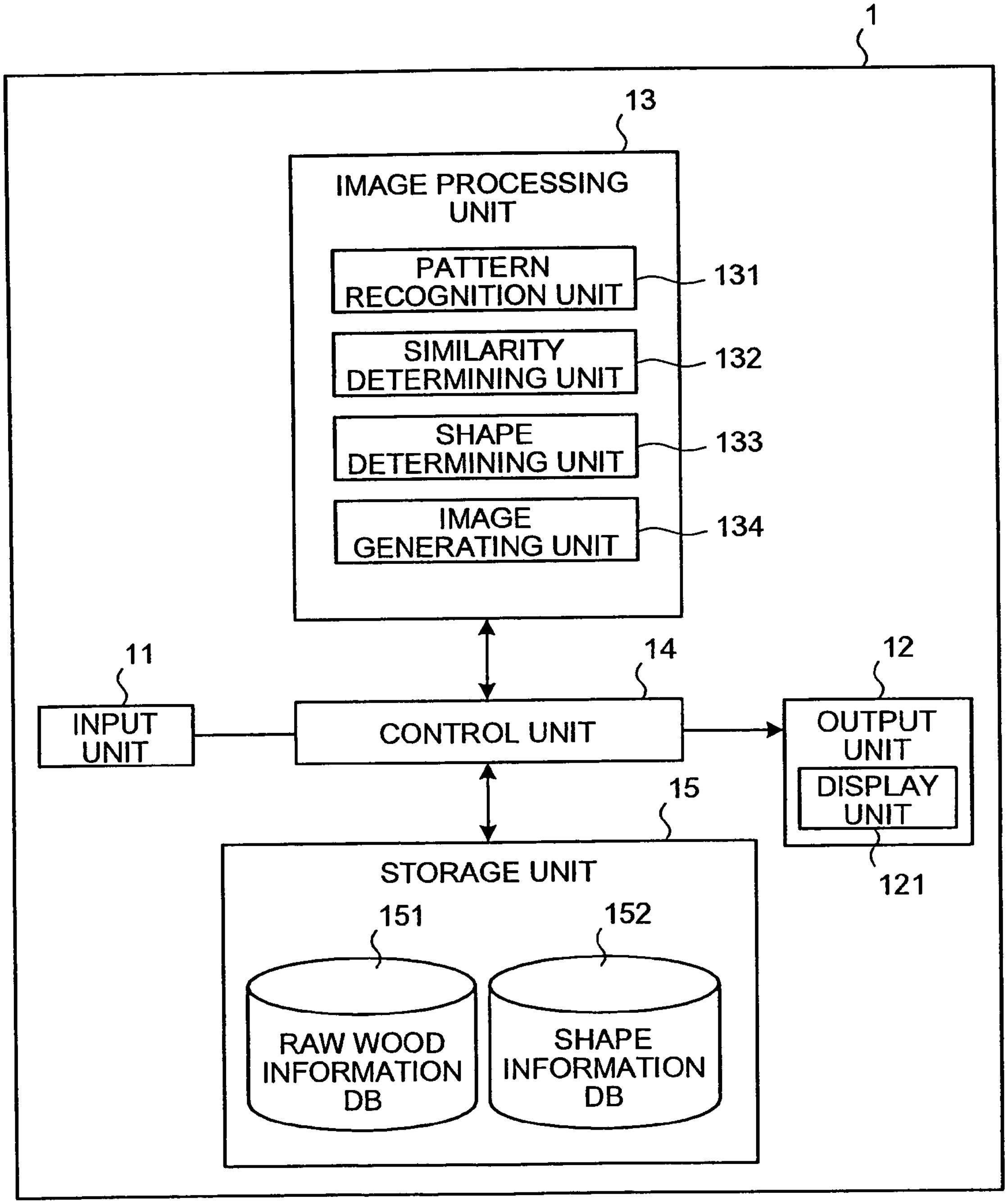
FIG. 1 is a block diagram of a functional structure of a simulation apparatus according to a first embodiment of the present invention.

FIG. 1 is a block diagram of a functional structure of a simulation apparatus according to a first embodiment of the present invention. A simulation apparatus 1 shown in FIG. 1 serves to generate a simulant image of a wooden piece with an indication of a position and a shape thereof in raw wood at shaping of the wooden piece from the raw wood in order to realize a grain pattern supplied by a user as an input on the wooden piece, and to output/display the generated simulant image.

The simulation apparatus 1 includes an input unit 11 which receives an input of information from outside, an output unit 12 which supplies information such as a result of simulation to outside, an image processing unit which performs image processing, a control unit 14 which controls an operation of the simulation apparatus 1, and a storage unit 15 which stores various information.

The input unit 11 is provided with a pointing device such as a mouse with which the user can select a piece of information such as image information displayed/output by the output unit 12 with a marker or the like similarly displayed/output by the output unit 12, and a keyboard or the like from which the user can input textual information. The input unit 11 serves to receive information on, for example, a desired grain pattern of the user, and an operation instruction signal supplied as an input to the simulation apparatus 1, and to transmit the received information, the operation instruction signal, or the like to the control unit 14.

The output unit 12 serves to display/output information such as an image and a text, and includes a display unit 121 which is implemented with a liquid crystal display, a plasma display, an organic electroluminescence (EL) display, or the like. Further, the output unit 12 can include a printer to supply output information in a form of printed media such as a paper, and a speaker to supply output information in an audio format to outside.

The image processing unit 13 includes a pattern recognition unit 131 which performs pattern recognition of information, such as a grain pattern, received by the input unit 11, a similarity determining unit 132 which examines correlation between the grain pattern recognized by the pattern recognition unit 131 and grain information of raw wood stored in the storage unit 15 in advance to determine a degree of similarity therebetween, a shape determining unit 133 which determines whether a wooden piece can be cut out from the raw wood so that the wooden piece has the grain pattern received by the input unit 11 on a surface thereof and has a predetermined shape, and an image generating unit 134 which generates an image to be displayed/output from the output unit 12 as a result of simulation.

The control unit 14 is realized, for example, with a central processing unit (CPU) which has functions of operating and controlling, and controls various processing operation by reading out a simulation program stored in the storage unit 15. The simulation program can be widely distributed in a form of a computer readable recording medium such as a hard disk, a flexible disk, a CD-ROM, a DVD-ROM, an MO disk, a PC card, an xD picture card, and an SD memory card.

The storage unit 15 includes a raw wood information database (DB) 151 which stores information on raw wood as a raw material, and a shape information DB 152 which stores information on shapes of a wooden piece cut out from the raw wood before and after compression. The storage unit 15 is implemented by a read only memory (ROM) which stores a program for launching a predetermined operating system (OS), a simulation program for performing various processing relating to the first embodiment, or the like, and a random access memory (RAM) which stores an operating parameter, data, or the like of respective processing.

Alternatively, the storage unit 15 may be implemented with an interface to which one of the above-mentioned recording media can be connected, and a predetermined recording medium connected thereto. Such interface may be implemented with a module such as a wireless local area network (LAN) module to which a memory card type LAN card can be connected.

Figure 2:
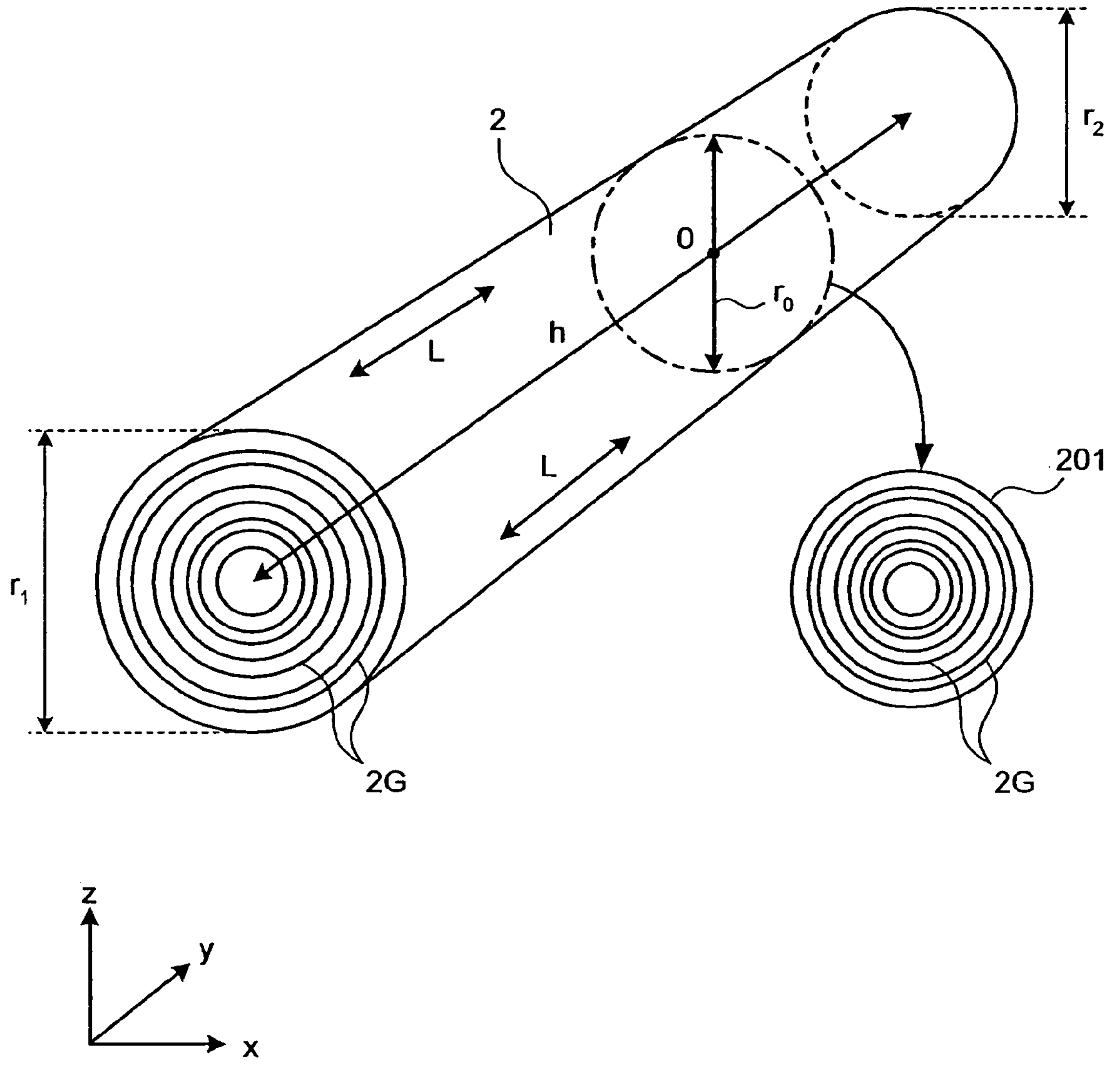
FIG. 2 is a schematic diagram of raw wood information.

FIG. 2 is a schematic diagram of raw wood information stored in the raw wood information DB 151. Raw wood 2 shown in FIG. 2 is uncompressed raw wood of which cross-sectional diameter is gradually decreasing from a proximal portion toward a distal portion, i.e., in a direction represented by +y in a coordinate system of FIG. 2. Raw wood information on the raw wood 2 is, for example, a grain pattern formed by grains 2G in a cross section at a proximal end, which is parallel with a x-z plane of FIG. 2, a diameter $r_1$ of the proximal cross section, a grain pattern formed by grains 2G in a cross section at a distal end, a diameter $r_2$ ($r_2<r_1$) of the distal cross section, a length h of the raw wood 2 in a lengthwise direction, i.e., a direction of y-axis in FIG. 2, and a direction L of wooden fibers of the raw wood 2. As the raw wood 2, Japanese cypress, hiba cedar, paulownia, Japanese cedar, pine, cherry, zelkova, ebony wood, teak, mahogany, and rosewood may be employed. Information on such types of wood employed as the raw wood 2 may also be stored in the raw wood information DB 151.

In addition, the raw wood information DB 151 stores information on cross sections at predetermined intervals of the raw wood 2. As an example of such information, FIG. 2 shows a cross section 201. The cross section 201 has a diameter $r_0$ and a grain pattern formed by the grains 2G which is substantially the same as the grain pattern of the proximal end. The information on such a cross section can be obtained via interpolation of measured values, for example, of the diameter $r_1$ of the proximal cross section, the diameter $r_2$ of the distal cross section, and the length h of the lengthwise direction, of an external shape of the raw wood 2, as appropriate. The information on a cross section obtained via interpolation is advantageous when a wood core runs straight and an internal fabric construction is substantially uniform over the entire length with the core as a center thereof in the raw wood 2.

On the other hand, when storage of more precise information on the shape and the grains of the raw wood 2 is desirable, detailed measurement may be performed with respect to the shape, the diameter, or the like, of the cross section of the raw wood 2 by techniques such as X-ray tomography, ultrasonic computed tomography, and nuclear magnetic resonance tomography, and the results of measurement may be stored in the raw wood information DB 151. A technique to be actually employed may be selected from those mentioned above depending on the type of wood employed as the raw wood 2, a use of a finished product, a shape of a wooden piece to be cut out from the raw wood 2, for example.

The raw wood information stored in the raw wood information DB 151 may be information on a sample of raw wood with a typical shape, or information on actual raw wood employed for processing. When the information on the sample is stored, the raw wood information DB 151 does not need to have a high capacity, since the raw wood information DB 151 has only to store information on a cross-sectional grain pattern found in raw wood of a particular diameter and of a particular type. On the other hand, when information on respective actually employed woods is to be stored, simulation can be realized with high accuracy.

Next, information stored in the shape information DB 152 will be described. The shape information DB 152 stores information on a desired shape (including dimension) of a wooden piece after compression, a necessary shape (including dimension) of a wooden piece cut out from the raw wood 2 for the manufacturing of a compressed wood product with a desired shape, and a tolerable error in shape at cutting work on the raw wood 2. Among these pieces of information, the tolerable error in shape at cutting work is referred to at determining processes by the similarity determining unit 132 and the shape determining unit 133 of the image processing unit 13.

The simulation apparatus 1 with the above-described structure is implemented with one or more computers. When the simulation apparatus 1 is realized with a plurality of computers, computers each realizing at least a part of functions of the simulation apparatus 1 may be directly connected with each other, or alternatively, may be connected with each other via a suitable communication network such as the Internet, a private network, or a telephone network.

Figure 3:
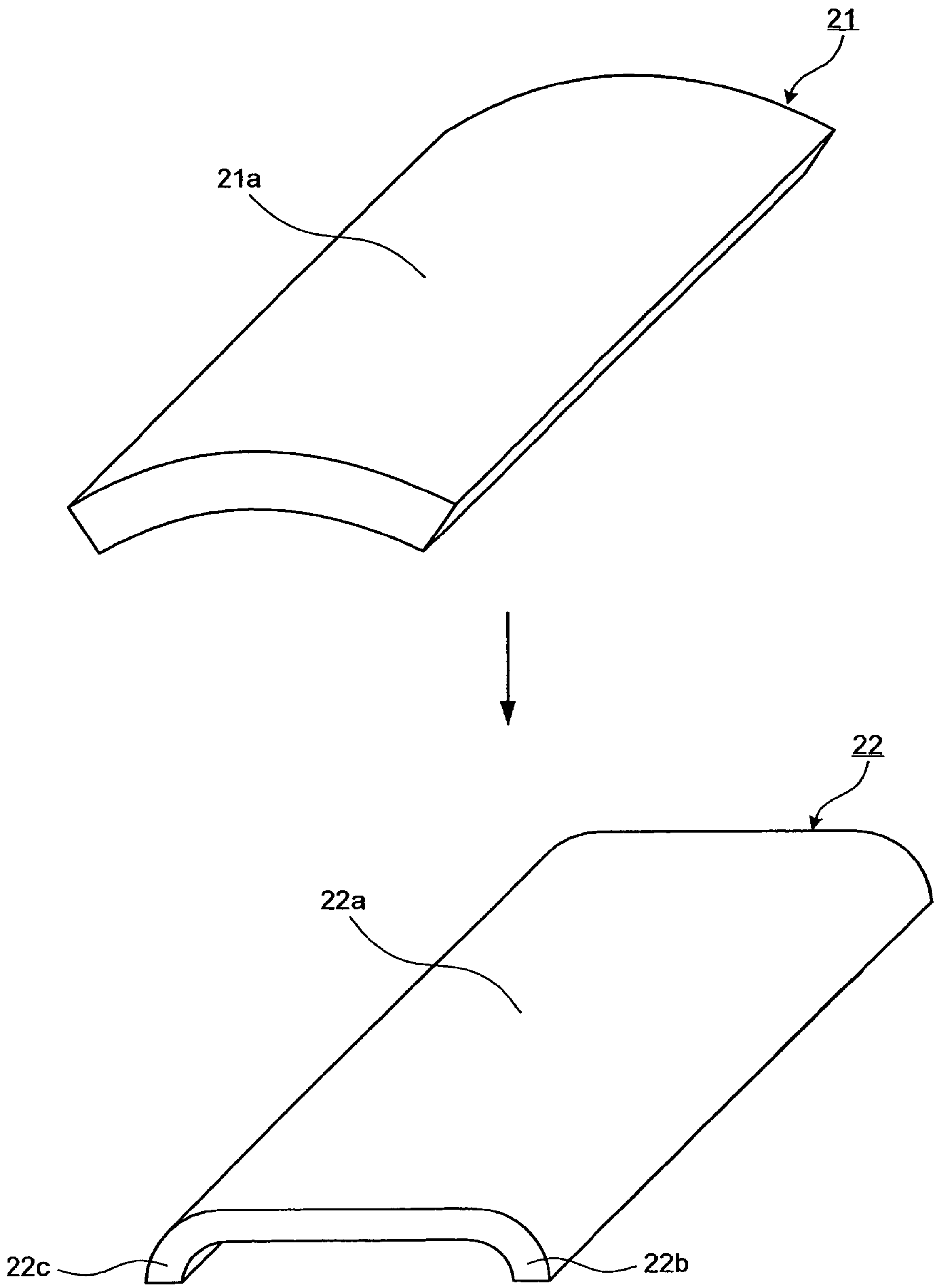
FIG. 3 is a diagram showing changes in a shape of a wooden piece cut out from raw wood caused by compression.

FIG. 3 is a diagram showing changes in the shape of a wooden piece assumed to be caused by the compression process and the following description is based on this assumption. Since FIG. 3 intends to simply show the changes in the shape of the wooden piece caused by the compression, a grain pattern on a surface of the wooden piece is not shown. A wooden piece 21, which is cut out from the raw wood 2, is shaped so that a cross section which is parallel with a short side direction of an external surface 21*a* is of a curved shape like a part of a circular arc. The wooden piece 21 is cut out from the raw wood 2 so that the wooden piece 21 is of a larger volume than a finished product by an amount to be decreased in the compression process. A compressed wood product 22 which is obtained via compression of the wooden piece 21 includes a plate-like main plate portion 22*a*, and side plate portions 22*b* and 22*c* that extend from respective opposing long sides of the main plate portion 22*a*, and that form a predetermined angle with the main plate portion 22*a*.

Figure 4:
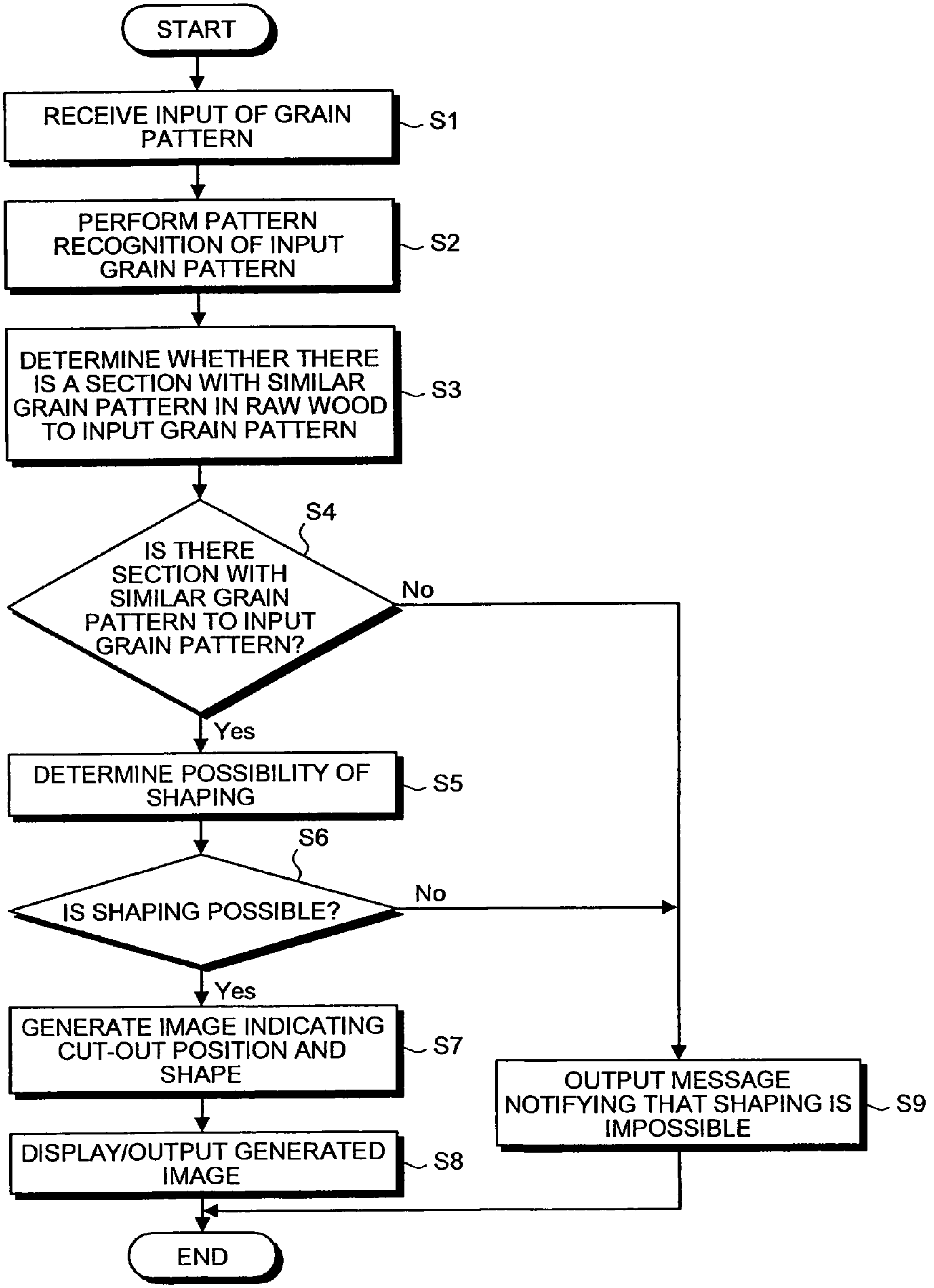
FIG. 4 is a flow chart of an overall process of a simulation method according to the first embodiment of the present invention.

An operation of the simulation apparatus 1 will be described. FIG. 4 is a flow chart of an overall process of a simulation method according to the first embodiment. First, the input unit 11 receives an input of a desirable grain pattern from the user (step S1). Then, the information on the received grain pattern is transmitted to the image processing unit 13 via the control unit 14, and the grain pattern is subjected to pattern recognition by the pattern recognition unit 131 of the image processing unit 13 (step S2).

The user inputs a desirable grain pattern by drawing the same on an image of the wooden piece 21 without grain pattern (see FIG. 3) displayed by the output unit 12 using a mouse, a keyboard, or the like provided in the input unit 11. For the input of a desirable grain pattern, a few types of grain patterns may be prepared as templates and stored in the storage unit 15, and the user may be prompted to choose one of the prepared grain patterns. Alternatively, the user may be prompted to draw a desirable grain pattern with a suitable drawing tool.

Figure 5:
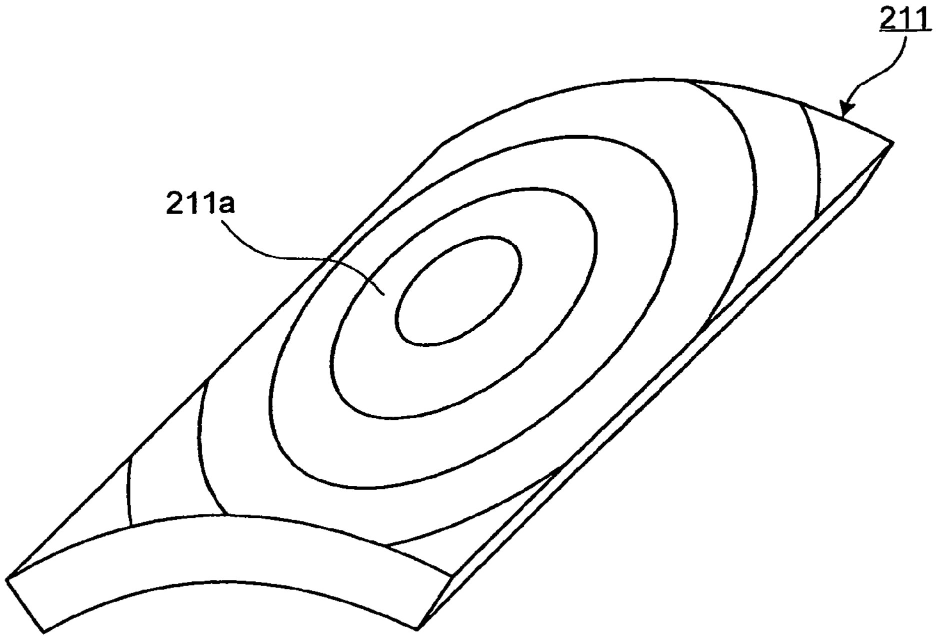
FIG. 5 is a diagram of an example of an input grain pattern, where a flat grain pattern appears on a surface of a wooden piece.
Figure 6:
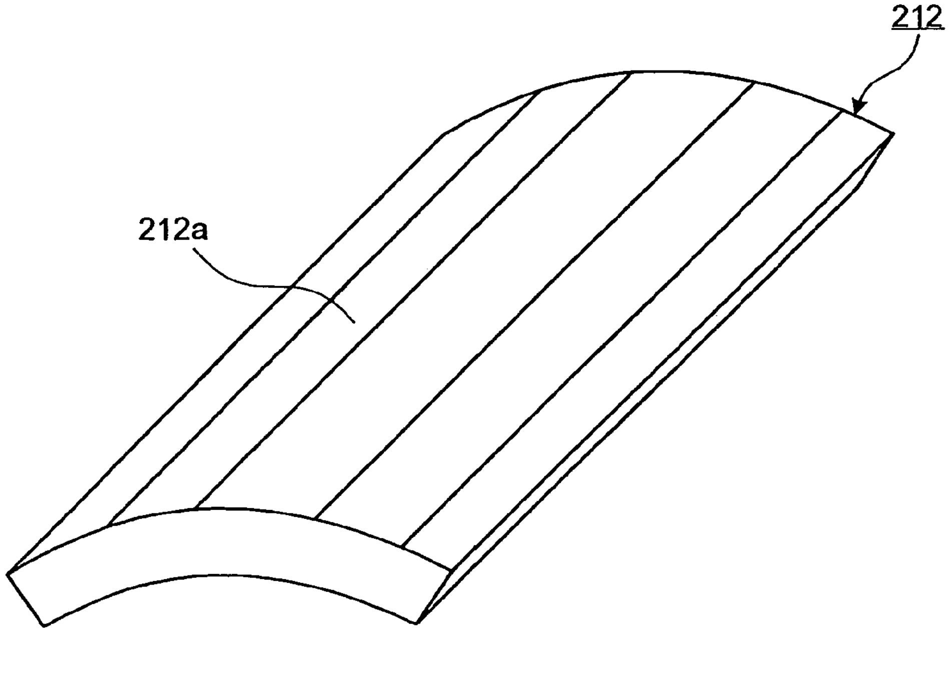
FIG. 6 is a diagram of an example of an input grain pattern, where a straight grain pattern appears on a surface of a wooden piece.

FIGS. 5 and 6 show examples of input grain patterns on the external surface 21*a* of the wooden piece 21 supplied by the user via drawing or selecting. A wooden piece 211 shown in FIG. 5 has a flat grain pattern on an external surface 211*a*, whereas a wooden piece 212 shown in FIG. 6 has a straight grain pattern on an external surface 212*a*.

Following step S2, the similarity determining unit 132 determines whether the raw wood 2 has a cross section of which grain pattern is similar to the grain pattern recognized in step S2 (step S3). More specifically, the similarity determining unit 132 matches the grain pattern which is recognized by the pattern recognition unit 131 and a grain pattern of the raw wood 2 read out from the raw wood information DB 151, to determine whether a section of which grain pattern resembles the recognized grain pattern to a predetermined degree is present inside the raw wood 2. At the determination, the tolerable error in shape stored in the shape information DB 152 for the shaping of the wooden piece is referred to. It should be noted that a "surface" in the description is a two-dimensional surface and includes a plane surface and a curved surface.

The similarity determining unit 132 may determine the similarity, for example, by comparing the input grain pattern and the grain pattern of the raw wood 2, and examining the correlation between the two grain patterns. In order to realize such manner of determination, grain patterns on various cut sections of the raw wood 2 may be stored in the storage unit 15, or such grain patterns may be generated by the image processing unit 134 based on the raw wood information of the raw wood 2. Still alternatively, conventionally employed techniques for object recognition may be adopted, for example, region splitting based on edge extraction, statistical pattern recognition based on cluster analysis, or the like can be employed.

When the similarity determining unit 132 determines that the raw wood 2 includes a cut section with a similar grain pattern to the input grain pattern as a result of similarity determination in step S3 as described above (Yes in step S4), the shape determining unit 133 determines whether a wooden piece can be cut out from the raw wood 2 so as to include the particular section (step S5). More specifically, the shape determining unit 133 determines whether the wooden piece 21 can be cut out from the raw wood 2 so that the wooden piece 21 includes the cut section found in step S3 as one surface and is similarly shaped to a shape stored in the shape information DB 152 to a predetermined degree. At the shape determination, the tolerable error in shape stored in the shape information DB 152 for the shaping of the wooden piece is referred to.

When it is determined as a result of the determination in step S5 on possibility of shaping, that the shaping of a wooden piece with the cut section of the desired grain pattern and substantially the same shape as the wooden piece 21 is physically impossible, even though the cut section of the desired grain pattern exists in the raw wood 2, such input can be eliminated from a simulation target based on the determination as impossible shaping. In addition, when realization of a desirable grain pattern on a surface of the wooden piece is given priority in the shaping, the curvature of the external surface of an obtained wooden piece may be notably different from the curvature of the external surface 21*a* of the wooden piece 21. Then the compressed wood product 22 may not be manufactured in an appropriate finished shape. Such input grain pattern is also eliminated from the simulation target.

When it is determined that it is possible to cut out a wooden piece which can be processed into an appropriate compressed wood product with a desirable grain pattern as a result of determination in step S5 (Yes in step S6), the image generating unit 134 of the image processing unit 13 generates a simulant image which indicates a position from which the wooden piece can be cut out and a shape of the wooden piece (step S7) and displays/outputs the simulant image at the display unit 121 (step S8). Here in step S8, a grain pattern which can be obtained from the raw wood 2 may be displayed together with the simulant image generated in step S7 so that the user can refer to the simulant image together with the grain pattern.

Figure 7:
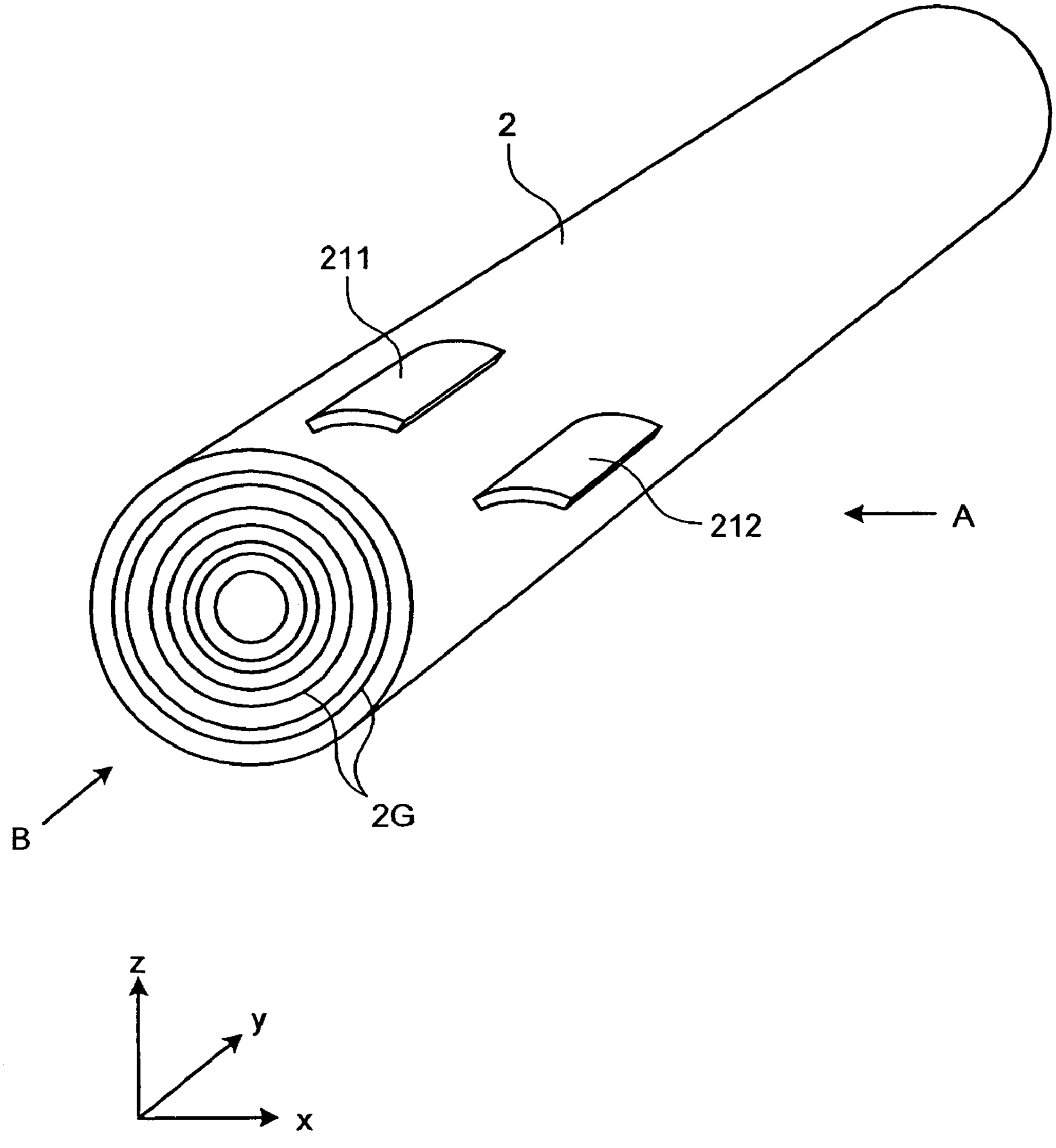
FIG. 7 is a diagram of an example of an output display of a result of simulation provided by an output unit.
Figure 8:
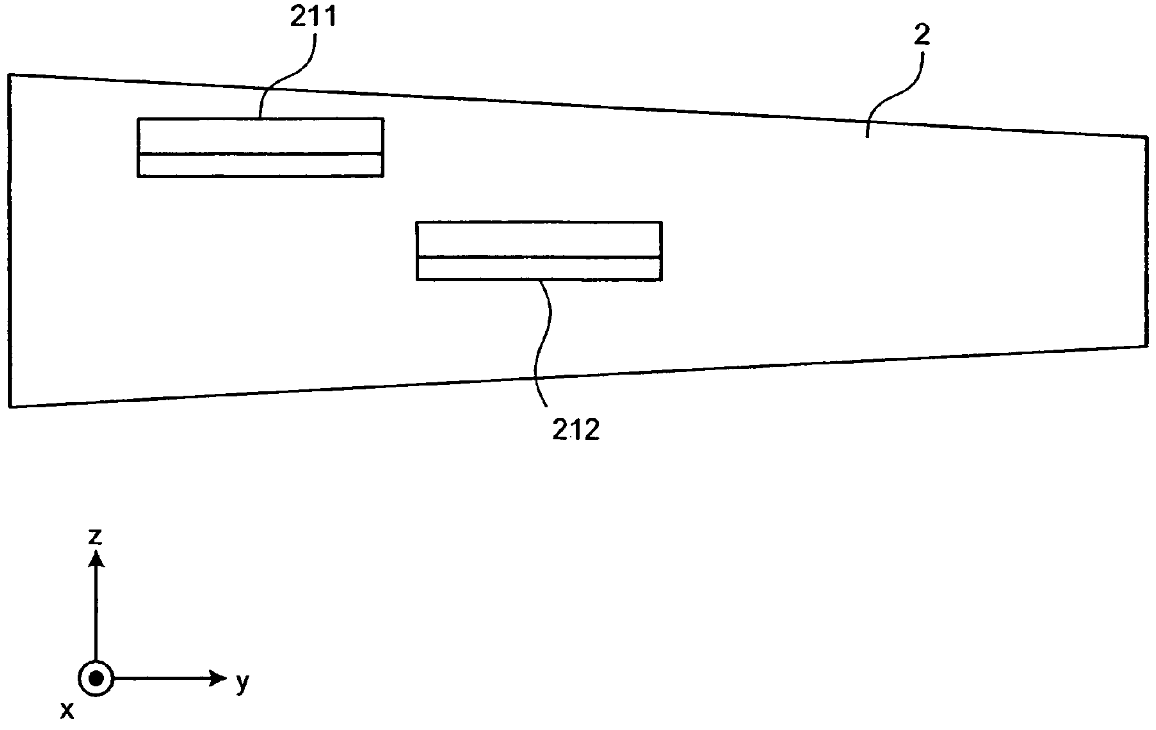
FIG. 8 is a diagram of an example of an output display of a result of simulation viewed from a direction indicated by an arrow A in FIG. 7.
Figure 9:
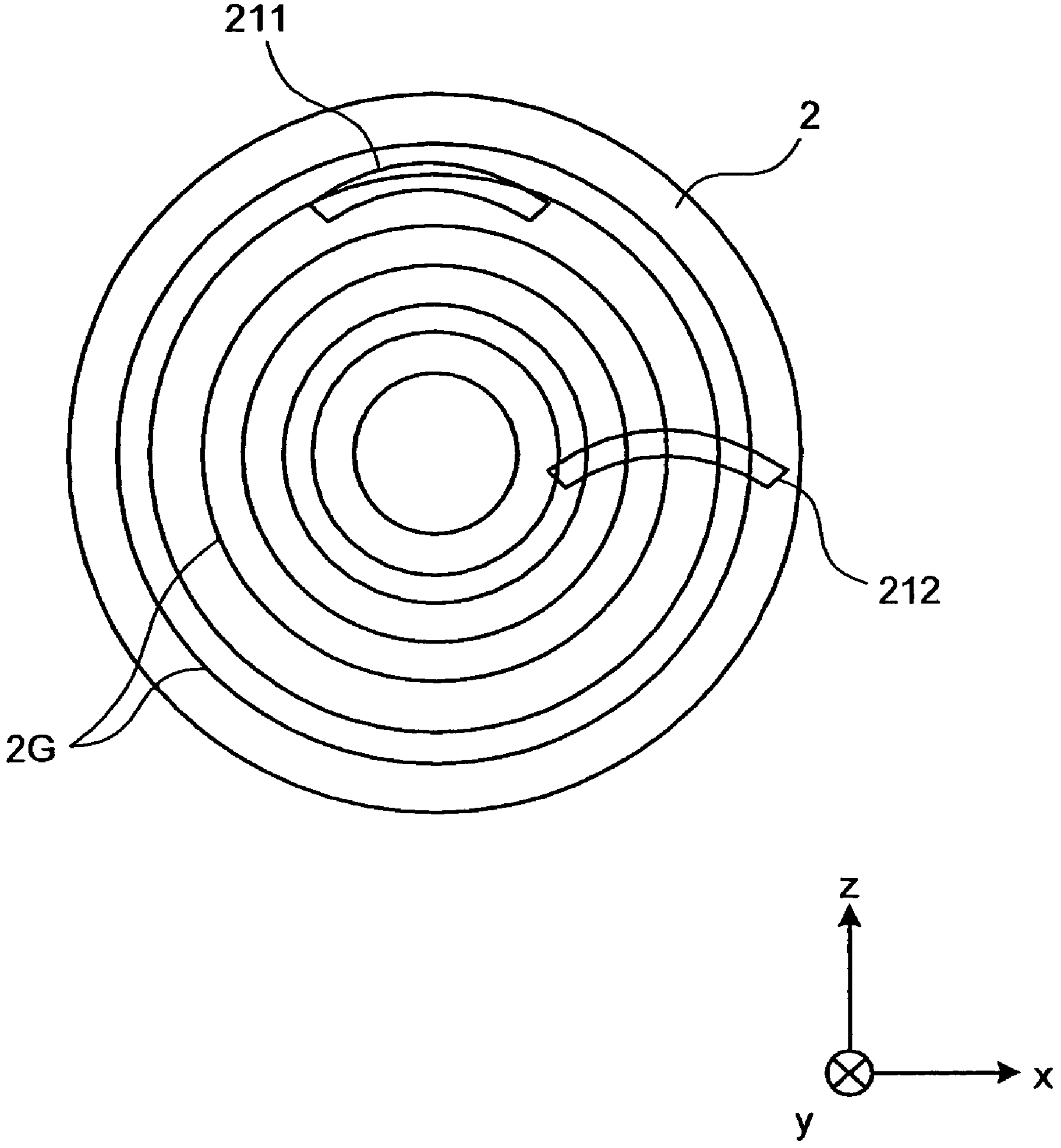
FIG. 9 is a diagram of an example of an output display of a result of simulation viewed from a direction indicated by an arrow B in FIG. 7.

FIGS. 7 to 9 are diagrams of displayed/output examples of results of simulation provided at the output unit 12. More specifically, FIGS. 7 to 9 are schematic diagrams of cut-out positions in the raw wood 2 of the wooden piece 211 (see FIG. 5) with the flat-grain surface on the external surface 211*a* and the wooden piece 212 (see FIG. 6) with the straight-grain surface on the external surface 212*a*. In particular, FIG. 7 shows an image where the cut-out positions of the wooden pieces 211 and 212 are superposed onto the perspective view of the raw wood 2. Further, FIG. 8 shows an image where the cut-out positions of the wooden pieces 211 and 212 are superposed onto the side view of the raw wood 2 seen from a direction indicated by an arrow A in FIG. 7. Further, FIG. 9 shows an image where the cut-out positions of the wooden pieces 211 and 212 are superposed onto the side view of the raw wood 2 seen from a direction indicated by an arrow B in FIG. 7. When these images are displayed at the display unit 121, three images respectively shown in FIGS. 7 to 9 may be displayed at the same time, or alternatively, each of three images may be displayed and switched over from one to another according to the input of the operation instruction signal from the input unit 11 by the user.

When there are plural cut-out positions and shapes that would allow for the shaping of a wooden piece with one surface having the received grain pattern input in step S1, a simulant image is selectively generated and displayed based on a position and a shape which may realize highest similarity of the grain pattern. Further, when the user supplies the operation instruction signal for printing of the image, the simulant image may be printed out on a medium such as paper by a printer provided in the output unit 12.

When the similarity determining unit 132 determines that the raw wood 2 does not include a cut section of which grain pattern is similar to the received grain pattern to a predetermined degree as a result of the similarity determination in step S3 (No in step S4), a message is supplied as an output by the output unit 12 to notify that the shaping is not feasible for the received grain pattern (step S9), and the operation ends. Further, when the shape determining unit 133 determines that the shaping of the wooden piece 21 is impossible as a result of determination on shaping possibility in step S5 (No in step 6), the process proceeds to step S9 to perform the above-described processing.

In the simulation method according to the first embodiment as described above, it is determined whether the raw wood includes a cut section which has a similar grain pattern to the grain pattern desired by the user wants to a predetermined degree, and when the raw wood 2 has such a cut section inside, it is determined whether a wooden piece, which is cut out as to include the desirable grain pattern on one surface, can be properly processed into a compressed wood product. Only when the received grain pattern is determined to be feasible according to these two types of determination, the simulant image indicating the cut-out position and the shape is generated and displayed. Thus, image processing can be performed without unnecessary operations.

Next, the compression process to process the wooden piece 21 actually cut out from the cut-out position found by the simulation method as described above in the raw wood 2 into the compressed wood product 22 will be outlined. Before the compression process, the wooden piece 21 is left in a water vapor atmosphere in high temperature and high pressure for a predetermined time period. In the description, "high temperature" means temperatures in the range of 100 to 230 degrees Centigrade (° C.), and more preferably temperatures in the range of approximately 180 to 230° C., and "high pressure" means pressures in the range of 0.1 to 3 Megapascal (MPa), and more preferably pressures in the range of approximately 0.45 to 2.5 MPa. Thus, the wooden piece 21 absorbs water in excess to be softened. Thereafter, the wooden piece 21 is compressed in a similar water vapor atmosphere as described above. Here, the wooden piece 21 is left in the water vapor atmosphere with a certain temperature and pressure as described above. Alternatively, however, the wooden piece 21 may be heated by high-frequency electromagnetic waves such as microwaves before compression.

Figure 10:
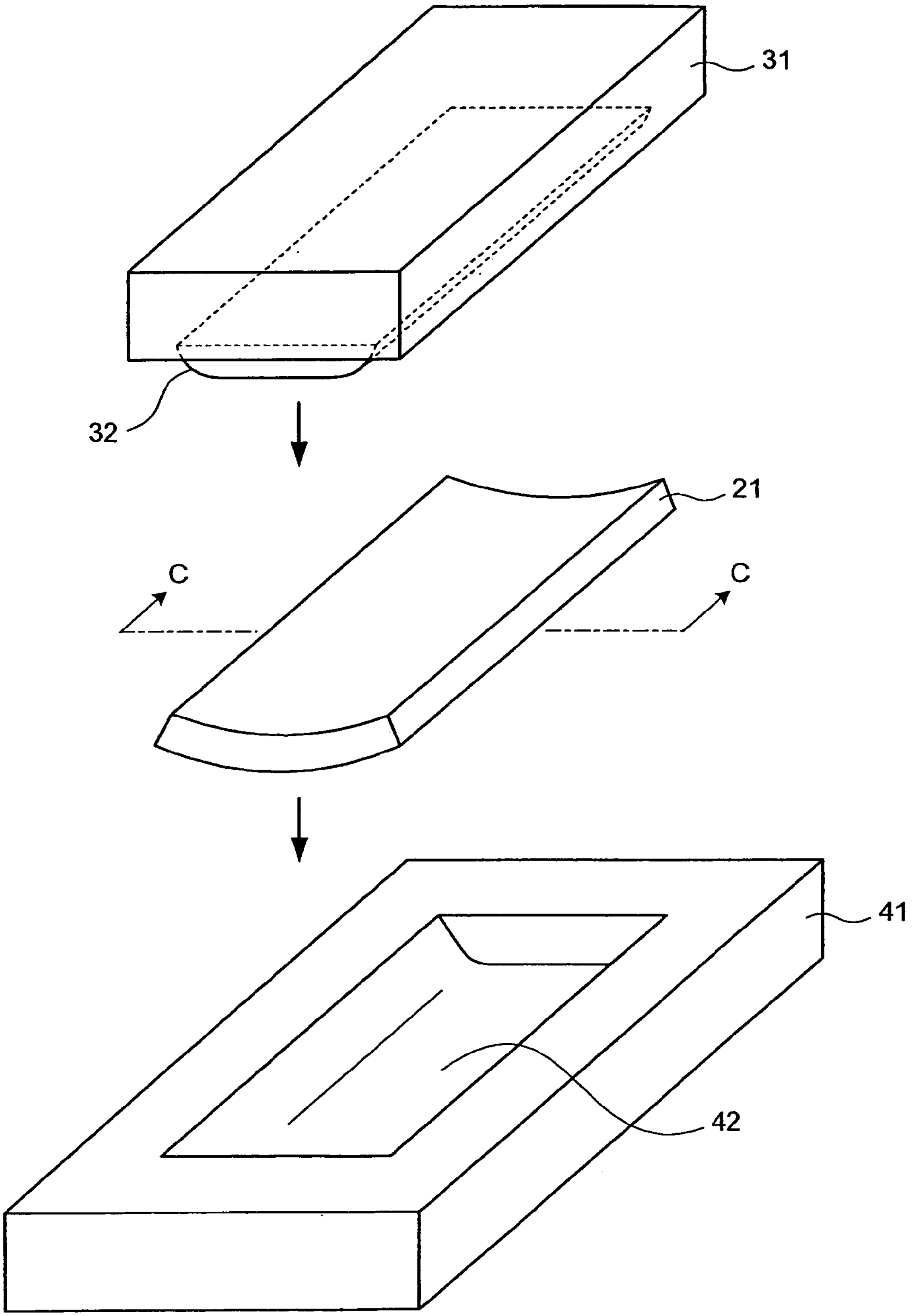
FIG. 10 is an explanatory diagram schematically showing how a wooden piece cut out from raw wood is compressed in a compression process.
Figure 11:
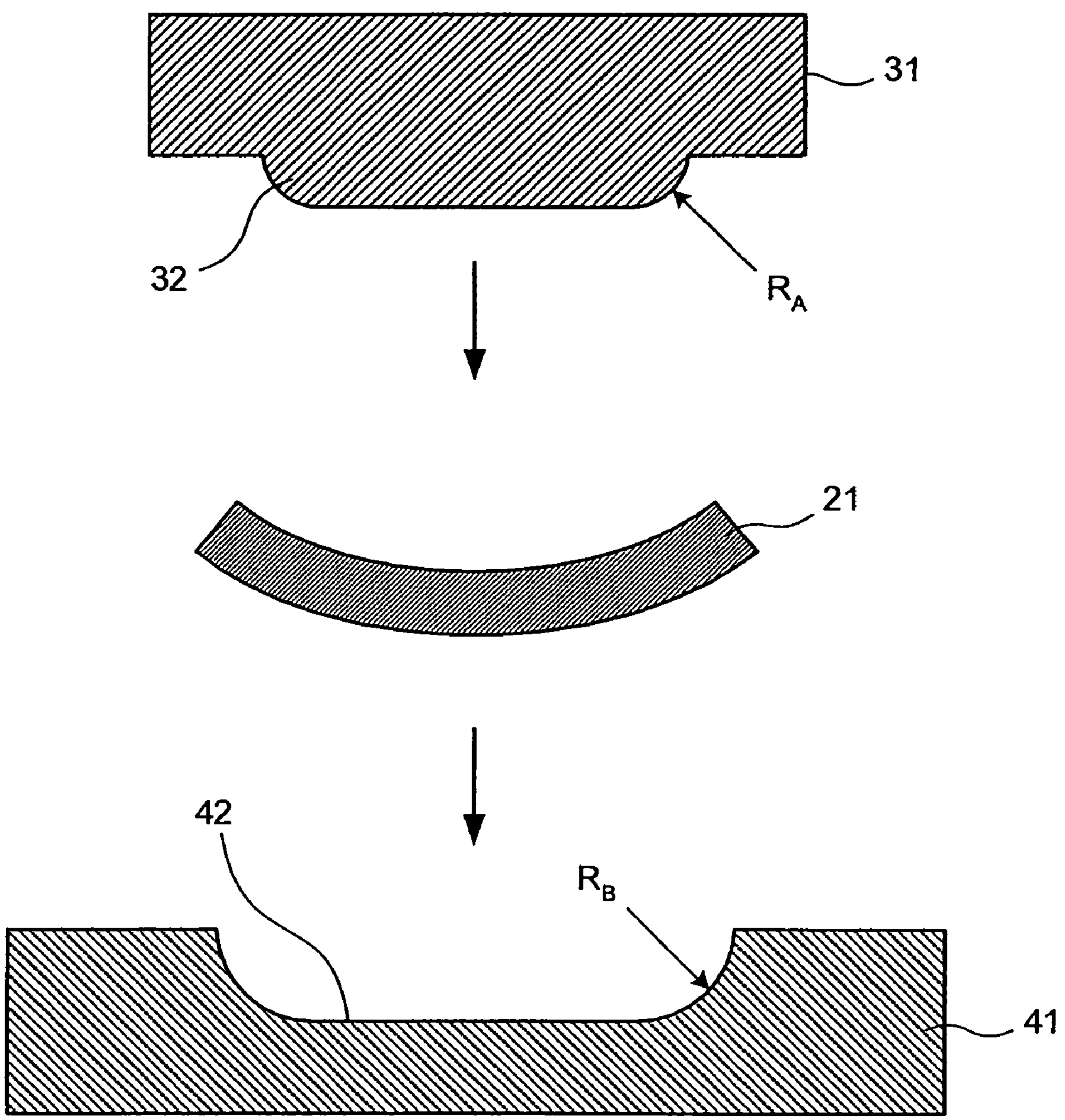
FIG. 11 is a sectional view along a line C-C shown in FIG. 10.

FIG. 10 is a diagram showing an overall process of the compression process to compress the wooden piece 21 with a pair of metal molds, and a structure of the pair of metal molds, and FIG. 11 is a vertical sectional view along a line C-C of FIG. 10. The metal mold 31 which applies compressing force to the wooden piece 21 from above has a protrusion 32 which fit an internal surface of the wooden piece 21. The metal mold 41 which applies compressing force to the wooden piece 21 from below at the time of compression has a depression 42 which fit an external surface of the wooden piece 21. As shown in FIG. 11, the radius RA of curvature of a curved surface of the protrusion 32 and the radius RB of curvature of a curved surface of the depression 42 must be smaller than the radius of curvature of the wooden piece 21 which has a curved surface with a uniform curvature. In other words, the wooden piece 21 is shaped out and the protrusion 32 and the depression 42 are designed so as to satisfy the above-mentioned relation of the radii of curvature.

Figure 12:
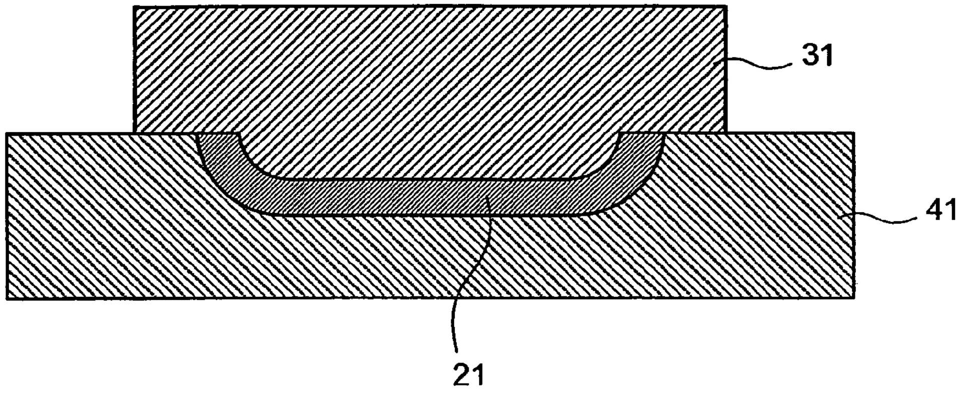
FIG. 12 is a sectional view of a wooden piece compressed by a pair of metal molds.

FIG. 12 is a vertical sectional view along the same section as shown in FIG. 11 of the wooden piece 21 sandwiched between and compressed by the metal molds 31 and 41 fitted together after the compression. The wooden piece 21 is deformed into a three-dimensional shape corresponding to a gap formed between the metal molds 31 and 41, receiving the compressing force from the metal molds 31 and 41 in the state shown in FIG. 12. Here, a thickness of the wooden piece 21 after the compression process is approximately 30% to 50% of the thickness in the uncompressed state as cut out from the raw wood 2. As a result of compression, the density of wooden fibers increases compared with the density before the compression, whereby the strength of the wooden piece 21 increases.

Figure 13:
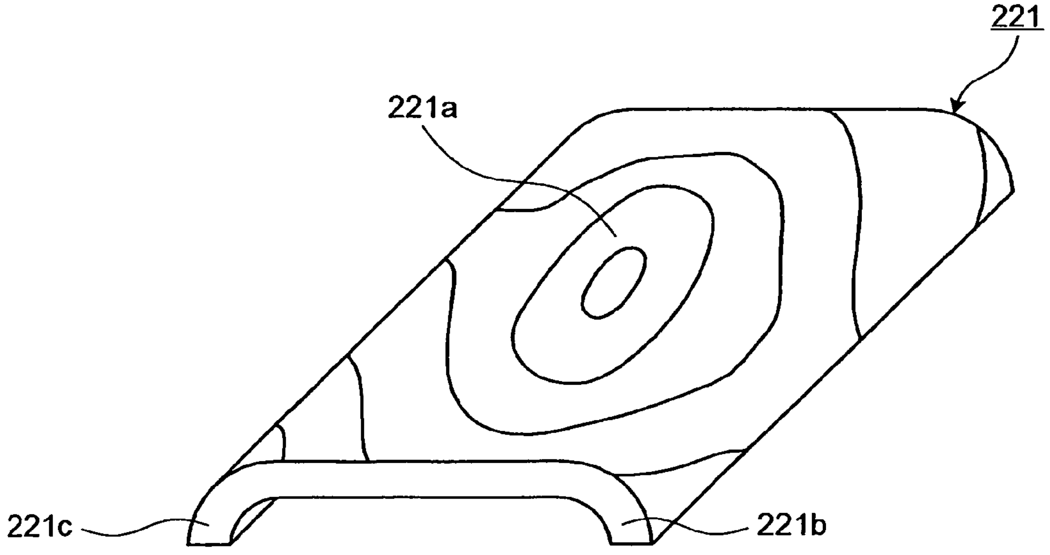
FIG. 13 is a perspective view of a structure of a compressed wood product after the compression process.

After the wooden piece 21 is left in the compressed state as shown in FIG. 12 for a predetermined time period, the metal mold 31 is separated from the metal mold 41 to release the wooden piece 21 from compression and water vapor atmosphere, and then the wooden piece 21 is dried. Thus, the processing of the compressed wood product 22 is completed. FIG. 13 is a perspective view of a structure of a compressed wood product 221 obtained via compression of the wooden piece 211 having the external surface with a flat-grain pattern. The compressed wood product 221 shown in FIG. 13 has a similar grain pattern on an external surface to the grain pattern of the external surface 211*a* of the wooden piece 211 before the compression other than in largely deformed portions from the wooden piece 21, i.e., in a vicinity of a curved portion between the main plate portion 221*a* and the side plate portion 221*b*, and in a vicinity of a curved portion between the main plate portion 221*a* and the side plate portion 221*c*.

The compressed wood product manufactured according to the compression process described above can be applied as a covering material for various electronic devices such as a digital camera, a portable telephone, a portable communication terminal (PHS, PDA, or the like), a portable audio device, an IC recorder, a portable television, a portable radio, remote controls for various home appliances, and a digital video. More preferably, the thickness of the compressed wood product at the application to these electronic devices is approximately 1.6 millimeters (mm).

According to the first embodiment as described above, a grain pattern which is to be shown on one surface of a wooden piece cut out from raw wood is supplied as an input. Then, it is determined whether a wooden piece with a predetermined three-dimensional shape can be cut out from the raw wood so that the cut-out wooden piece has a surface with a similar grain pattern to the input grain pattern, with the use of at least the input grain pattern, raw wood information, and shape information. When the shaping of such wooden piece is determined to be possible as a result of determination, a simulant image indicating a cut-out position and a shape of a wooden piece in the raw wood is generated and the generated simulant image is supplied as an output. Thus, a cut-out position and a shape in the raw wood to realize the desirable grain pattern can be known from the simulant image. As a result, the raw wood is not wasted in the processing, and the yield can be improved.

Further, according to the first embodiment, it is determined whether the raw wood includes a cut section which has a similar grain pattern to the grain pattern desired by the user. When the raw wood includes a section of the desirable grain pattern, it is further determined whether the compressed wood product can be properly formed from such wooden piece. Only when the received grain pattern is determined to be feasible according to these two types of determination, the simulant image indicating the cut-out position and the shape is generated and displayed. Thus, image processing can be performed without unnecessary operations.

The first embodiment as described above is suitable for manufacturing custom-made compressed wood products. According to the first embodiment, possibility of manufacturing a certain compressed wood product which satisfies a request of a customer on a grain pattern can be determined based on the request of the customer. Further, even if the manufacturing is not possible, a second best option can be immediately suggested. Thus, service can be provided to the customer with greater sensitivity.

A simulation apparatus according to a second embodiment has the same structure as the simulation apparatus 1 described according to the first embodiment. The simulation apparatus of the second embodiment, however, when determining that the raw wood 2 includes a cut section with a similar grain pattern to the input grain pattern, first generates a simulant grain pattern image which is expected to appear on a surface of the cut section, then prompts the user to determine whether the generated grain pattern image is good or not, and performs a following process based on the determination of the user.

Figure 14:
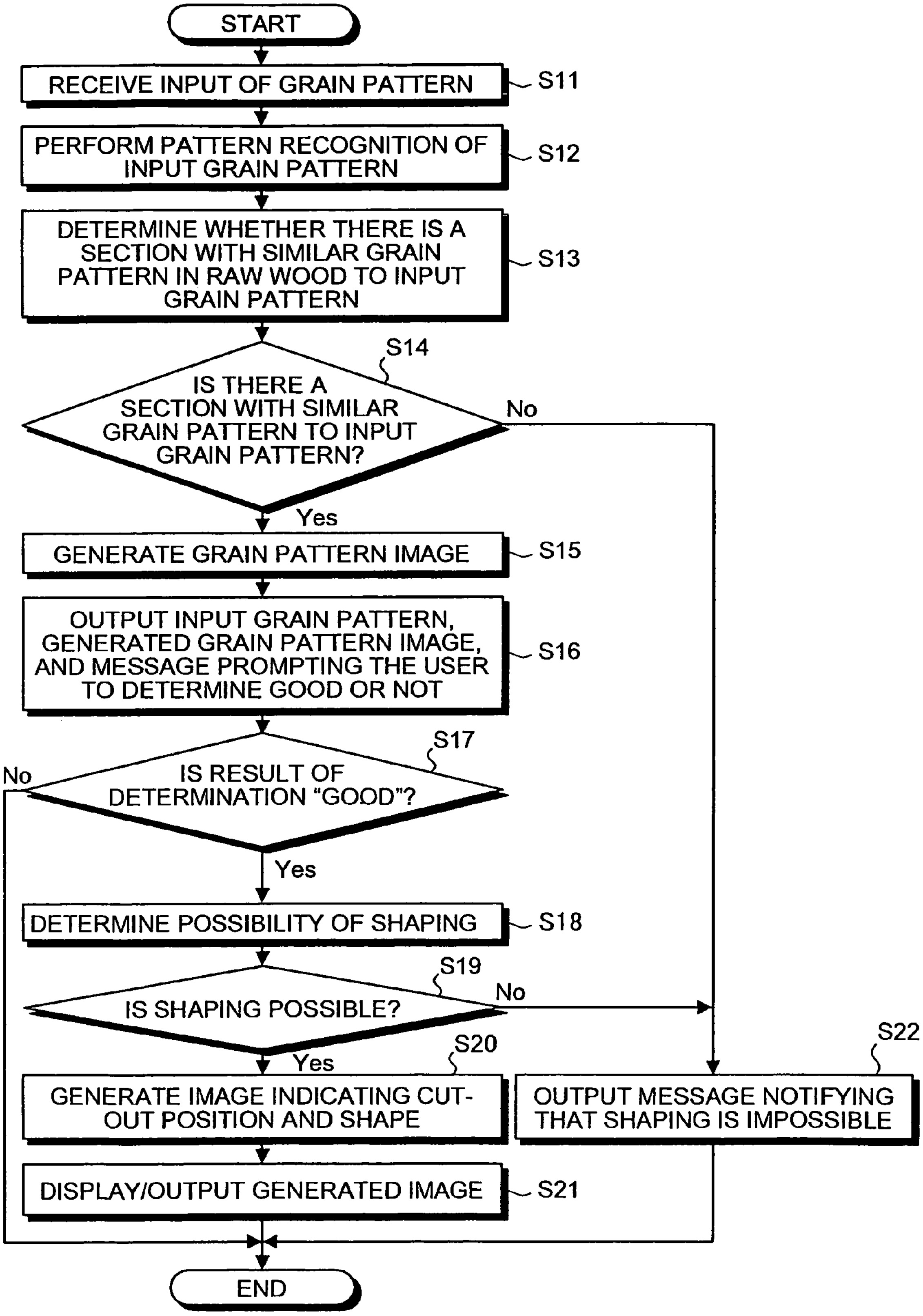
FIG. 14 is a flow chart of an overall process of a simulation method according to a second embodiment of the present invention.

FIG. 14 is a flow chart of an overall process of a simulation method according to the second embodiment of the present invention. In the second embodiment, first three process steps, i.e., reception of an input grain pattern (step S11), pattern recognition of the input grain pattern (step S12), and determination whether a cut section with a similar grain pattern to the input grain pattern is present in the raw wood 2 (step S13), are the same as the steps S1, S2, and S3, respectively, described above in detail in the description of the first embodiment.

When it is determined that the raw wood 2 includes a cut section with a similar grain pattern to the input grain pattern (Yes in step S14) as a result of similarity determination in step S13, the image generating unit 134 generates a simulant grain pattern image which shows the similar grain pattern on the cut section of the raw wood 2 (step S15). The image generation in step S15 is performed similarly to step S7 in the first embodiment. On the other hand, when it is determined that the raw wood 2 does not include a cut section with a similar grain pattern to the input grain pattern as a result of similarity determination in step S13 (No in step S14), the output unit 12 supplies message as an output notifying that the shaping is not possible (step S22), and the operation ends.

Figure 15:
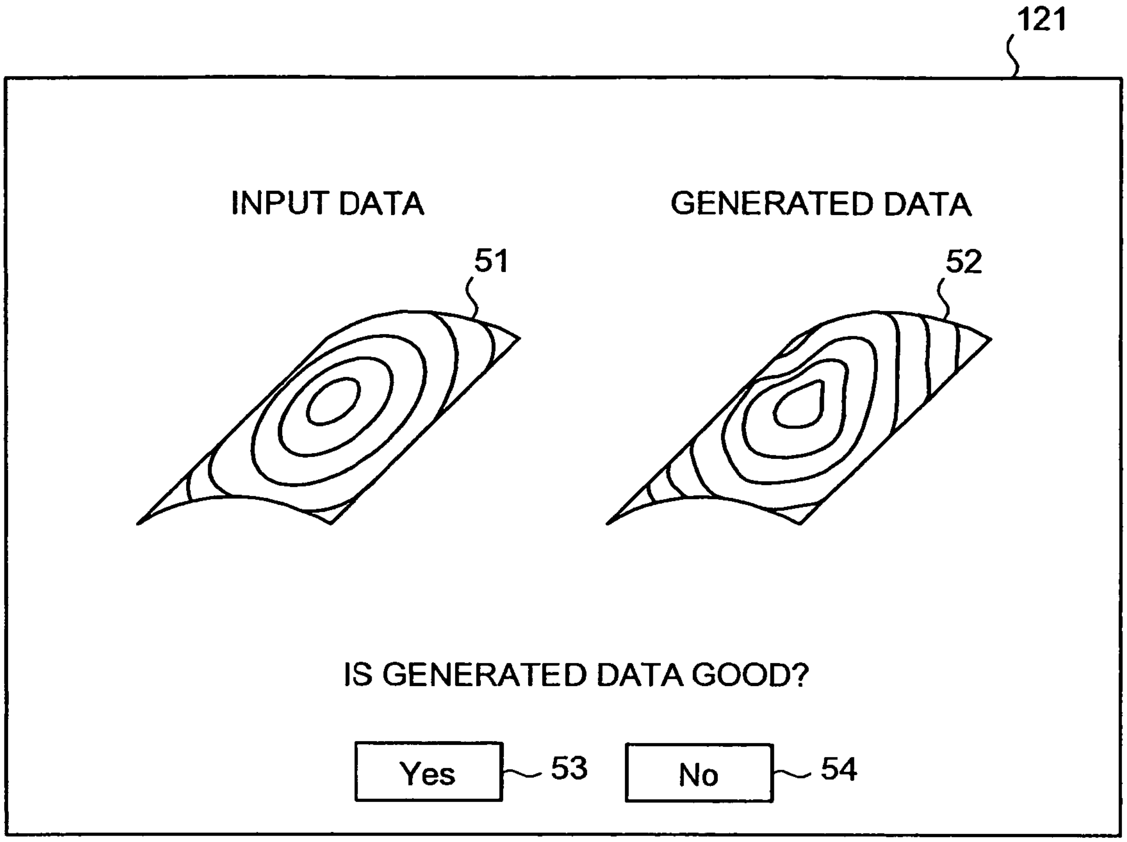
FIG. 15 is a diagram of an example of a display of a grain pattern image and a message supplied as outputs by a display unit to prompt the user to determine whether the grain pattern image is good or not.

After the generation of the simulant grain pattern image in step S15, the display unit 121 displays the generated simulant grain pattern image and the image supplied in step S11, together with a message prompting the user to determine whether the simulant grain pattern image is good or not (step S16). FIG. 15 is a schematic diagram of an example of output display on the display unit 121 in step S16. In FIG. 15, the display unit 121 displays a grain pattern 51 received in step S11 and a grain pattern 52 generated in step S15. In addition, two options 53 and 54 are given in a lower portion of the display unit 121 as a box indicating “Yes” (53) and a box indicating “No” (54).

The user seeing a screen with the output display as shown in FIG. 15 compares the grain pattern 51 and the grain pattern 52. When the grain pattern 52 is within a tolerable range, i.e., is determined to be “good” (Yes in step S17), the user inputs an operation instruction signal corresponding to the option 53 from the input unit 11.

Thereafter, the shape determining unit 133 determines whether the shaping of a wooden piece having a surface with a grain pattern corresponding to the grain pattern image 52 is possible from the raw wood 2 or not according to the input operation instruction signal (step S18). When the shape determining unit 133 determines that the shaping is possible (Yes in step S19), the image generating unit 134 generates a simulant image indicating a cut-out position and a shape of a wooden piece which can be cut out from the raw wood 2 (step S20) and the generated simulant image is displayed/output at the display unit 121 (step S21). Here in step S21, a grain pattern which can be obtained from the raw wood 2 may be displayed together with the simulant image generated in step S20 so that the user can refer to the simulant image together with the grain pattern. The details of steps S18, S20, and S21 are the same as details of steps S5, S7, and S8 described according to the first embodiment, respectively.

When it is determined that the raw wood 2 includes a cut section similar to the received grain pattern to a predetermined degree but that the shaping of a wooden piece including the cut section as one surface is physically impossible as a result of the determination in step S18 (No in step S19), a message is supplied as an output by the output unit 12 to notify that the shaping is not feasible for the received grain pattern (step S22), and the operation ends.

When the user cannot accept the displayed grain pattern image 52, the following processing is performed. When the user determines that the displayed grain pattern image is "not good" as a result of determination (No in step S17), the user supplies an operation instruction signal corresponding to the option 54 from the input unit 11 as an input. When such an operation instruction signal is supplied, the simulation apparatus 1 ends the operation.

In particular, the operation instruction signal may be input from the input unit 11 via manipulation of a pointing device such as a mouse, or via pushing of a key corresponding to each option on the keyboard. The display unit 121 may be structured as a touch-sensitive panel, so that the user can directly select the option 53 or the option 54 by touching a corresponding portion of the display. Further, the user may input the operation instruction signal via voice from a microphone provided in the input unit 11.

When there are plural cut-out positions and shapes that allow for the provision of the grain pattern input in step S11 as one surface, a cut-out position and a shape with the highest similarity of the grain pattern may be selected to generate and display an image in steps S15 and S20 mentioned above. Alternatively, plural images may be generated and displayed for all or a part of the plural positions and shapes, and the user may be prompted to choose one image. When plural images are displayed, the user can determine which cut-out position and shape is most appropriate by examining the plural images by him/herself. Thus, the determination can be made not simply based on the similarity of patterns, but also based on possible yield and other factors, whereby comprehensive judgment is allowed.

According to the second embodiment as described above, similarly to the first embodiment, the cut-out position and the shape of the wooden piece in the raw wood can be shown in the form of a simulant image for the realization of desirable grain pattern in the wooden piece, whereby the raw wood is not wasted at processing and improvement in yield can be realized.

Further, according to the second embodiment, the user sees the generated grain pattern image to determine whether the generated grain pattern image is good or not, and the subsequent processing, such as determination of shaping possibility and the image generation, is performed according to the determination of the user. Thus, the processing can be performed with greater sensitivity to the request of the user. In addition, when the user does not accept the generated grain pattern image, the subsequent processing is not necessary. Then, the needless image processing can be eliminated to reduce the load of the simulation apparatus.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A simulation method according to which a simulation apparatus generates a simulant image indicating a cut-out position of a wooden piece in raw wood and a shape of the wooden piece having a predetermined three-dimensional shape at shaping of the wooden piece from the raw wood, the simulation apparatus including a storage unit which stores raw wood information about a shape and a grain pattern of the raw wood and shape information about a shape of a wooden piece to be cut out from the raw wood, the simulation method comprising:

receiving an input of a desirable grain pattern which is to appear on a surface of a wooden piece cut out from the raw wood;

determining whether the wooden piece can be cut out from the raw wood so that the wooden piece has the three-dimensional shape and a surface showing a similar grain pattern to the received desirable grain pattern, based on the received desirable grain pattern, and based on the raw wood information and the shape information read out from the storage unit;

generating a simulant image indicating a cut-out position and a shape of the wooden piece in the raw wood, when it is determined that the wooden piece can be cut out; and outputting the generated simulant image.

2. The simulation method according to claim 1, wherein the wooden piece cut out from the raw wood is compressed and deformed through application of a predetermined compressing force, and the determining is implemented further based on information on a shape to be taken by the wooden piece after the compression.

3. The simulation method according to claim 1, wherein the determining includes determining whether a cut section with a grain pattern having a predetermined degree of similarity to the received desirable grain pattern is present in the raw wood or not; and determining whether a wooden piece having the cut section as a surface and having substantially the same shape as the three-dimensional shape can be cut out from the raw wood or not, when it is determined that the cut section is present in the raw wood.

4. The simulation method according to claim 1, wherein the determining includes determining whether a cut section with a grain pattern having a predetermined degree of similarity to the received desirable grain pattern is present in the raw wood or not;

generating a simulant grain pattern image which indicates a grain pattern on a surface of the cut section, when it is determined that the cut section is present in the raw wood;

supplying as an output the generated simulant grain pattern image together with information prompting a user of the simulation apparatus to input information on a result of determination by the user on whether the grain pattern image is good or not;

receiving an input of the information on the result of determination by the user an whether the grain pattern image is good or not based on the supplied simulant grain pattern image; and determining whether a wooden piece having the cut section as a surface and having substantially the same shape as the three-dimensional shape can be cut out from the raw wood or not, when information corresponding to the result of determination as "good" is received.

5. The simulation method according to claim 4, wherein the supplying further includes supplying as an output the received desirable grain pattern and the generated simulant grain pattern image.

6. A simulation apparatus which generates a simulant image indicating a cut-out position of a wooden piece in raw wood and a shape of the wooden piece having a predetermined three-dimensional shape at shaping of the wooden piece from the raw wood, comprising;

a storage unit that stores raw wood information about a shape and a grain pattern of the raw wood, and shape information about a shape of a wooden piece to be cut out from the raw wood;

an input unit that receives an operation instruction signal indicating an operation of the simulation apparatus, and an input of a desirable grain pattern which is to appear on a surface of the wooden piece cut out from the raw wood;

a determining unit which determines whether a the wooden piece can be cut out from the raw wood so that the wooden piece has the three-dimensional shape and a surface showing a similar grain pattern to the input grain pattern, based at least on the grain pattern received by the input unit, and the raw wood information and the shape information stored in the storage unit;

an image generating unit that generates a simulant image indicating a cutout position and a shape of the wooden piece in the raw wood based on a result of determination by the determining unit; and an output unit that supplies the simulant image generated by the image generating unit as an output.

7. The simulation apparatus according to claim 6, wherein the storage unit further stores information about a shape to be taken by the wooden piece after predetermined compression/formation of the wooden piece cut out from the raw wood, and the determining unit uses the information about the shape to be taken by the wooden piece after the compression/formation, for the determination.

8. The simulation apparatus according to claim 6, wherein the determining unit includes a similarity determining unit that determines whether a cut section with a grain pattern having a predetermined degree of similarity to the desirable grain pattern received by the input unit is present in the raw wood or not; and a shape determining unit that determines whether a wooden piece having the cut section as a surface and having substantially the same shape as the three-dimensional shape can be cut out from the raw wood or not.

9. The simulation apparatus according to claim 8, wherein the image generating unit generates a sirnulant grain pattern image which indicates a grain pattern on a surface of the cut section when the similarity determining unit determines that the cut section is present in the raw wood.

10. The simulation apparatus according to claim 9, wherein the shape determining unit performs determination according to a predetermined operation instruction signal supplied as an input by the user of the simulation apparatus based on the simulant grain pattern image output by the output unit.

11. A computer program product having a computer readable medium including programmed instructions for a simulation method according to which a simulation apparatus generates a simulant image indicating a cut-out position of a wooden piece in raw wood and a shape of the wooden piece having a predetermined three-dimensional shape at shaping of the wooden piece from the raw wood, the simulation apparatus including a storage unit which stores raw wood information about a shape and a grain pattern of the raw wood and shape information about a shape of a wooden piece to be cut out front the raw wood, wherein the instructions, when executed by a computer, cause the simulation apparatus to perform:

receiving an input of a desirable grain pattern which is to appear on a surface of a wooden piece cut out from the raw wood;

determining whether a wooden piece can be cut out from the raw wood so that the wooden piece has the three-dimensional shape and a surface showing a similar grain pattern to the received desirable grain pattern, based on the received grain pattern, and based on the raw wood information and the shape information read out from the storage unit;

generating a simulant image indicating a cut-out position and a shape of the wooden piece in the raw wood, when it is determined that the wooden piece can be cut out; and outputting the generated simulant image.

* * * * *